United States Patent [19]
Kenneth et al.

[11] Patent Number: 5,796,083
[45] Date of Patent: Aug. 18, 1998

[54] SELF-SERVICE TERMINAL CAPABLE OF DETECTING FRAUDULENT USE OF AN INTEGRATED CIRCUIT CARD

[75] Inventors: Alexander R. Kenneth; Mark J. Stewart, both of Dundee, Scotland

[73] Assignee: NCR Corporation, Dayton, Ohio

[21] Appl. No.: 681,541

[22] Filed: Jul. 23, 1996

[30] Foreign Application Priority Data

Dec. 14, 1995 [GB] United Kingdom ............... 9525519.6

[51] Int. Cl.⁶ .............. G06K 5/00; G06K 19/06
[52] U.S. Cl. .............................. 255/380; 235/492
[58] Field of Search ....................... 235/486, 492, 235/375, 379, 380, 382; 342/825.31, 825.34, 825.35

[56] References Cited

U.S. PATENT DOCUMENTS 3,655,946  4/1972  Morita et al. .............. 235/380
3,818,187  6/1974  Lovendusky et al. ........ 235/380

FOREIGN PATENT DOCUMENTS 2645318  10/1990  France ...................... 235/486

*Primary Examiner*—Donald T. Hajec
*Assistant Examiner*—Thien Minh Le
*Attorney, Agent, or Firm*—Michael Chan

[57] ABSTRACT

The invention relates to an apparatus means (102.104) for detecting an attempted fraudulent use of an intergrated circuit card. The invention is characterized by a card invalidation mechanism operable to render the card permanently non-usable in response to the detection of the attempted fraudulent use.

4 Claims, 7 Drawing Sheets

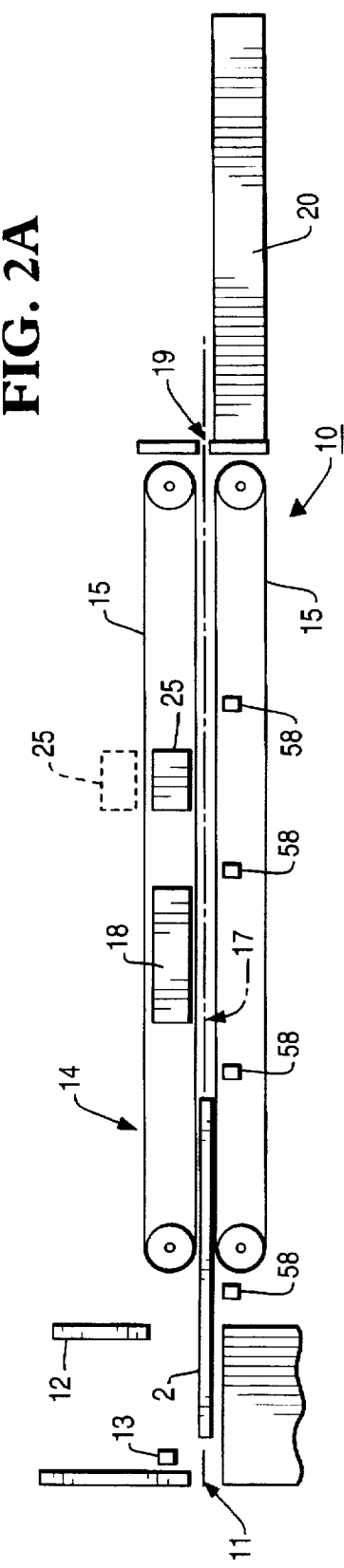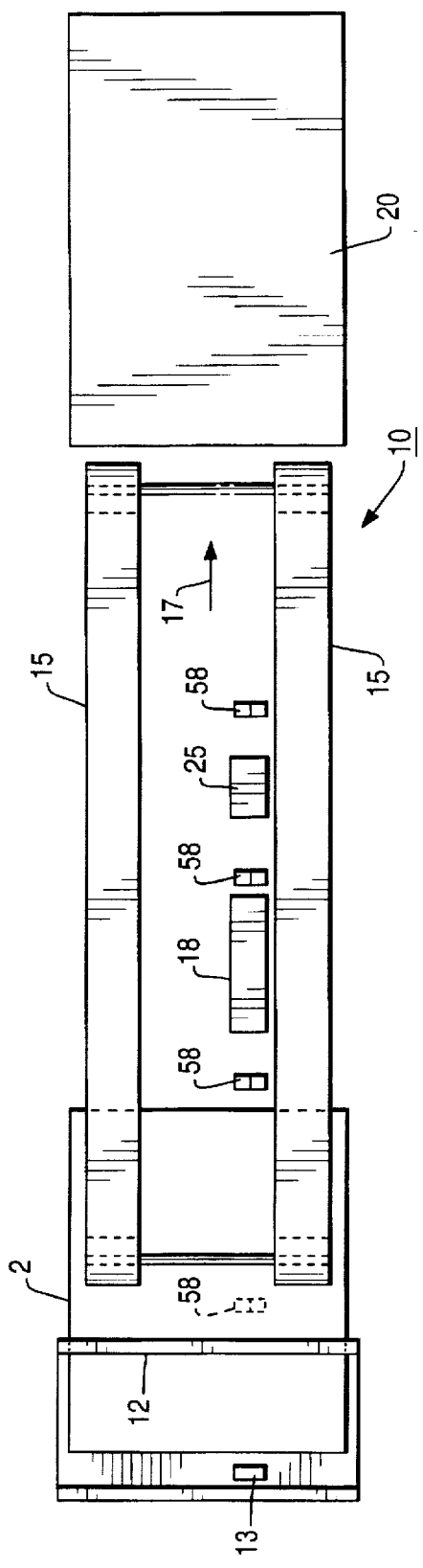

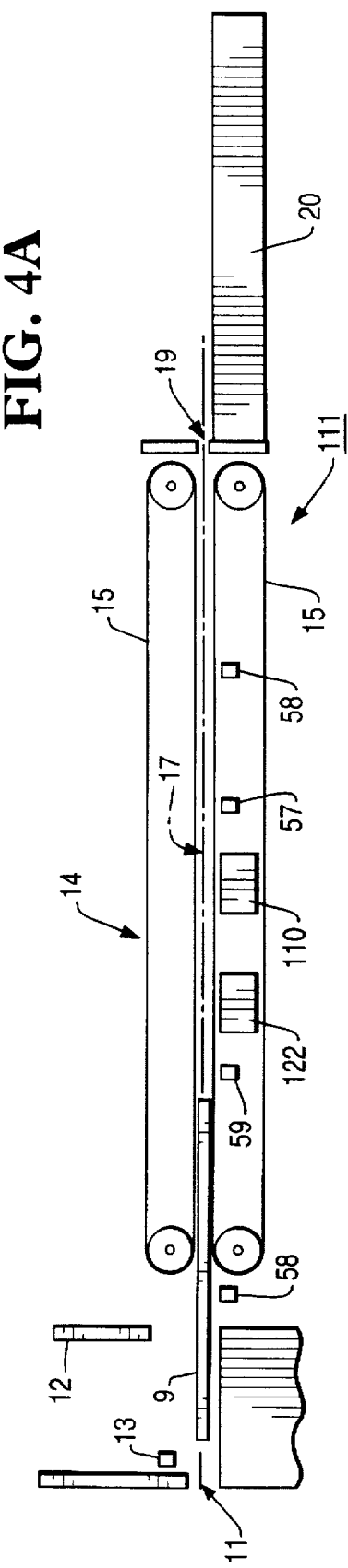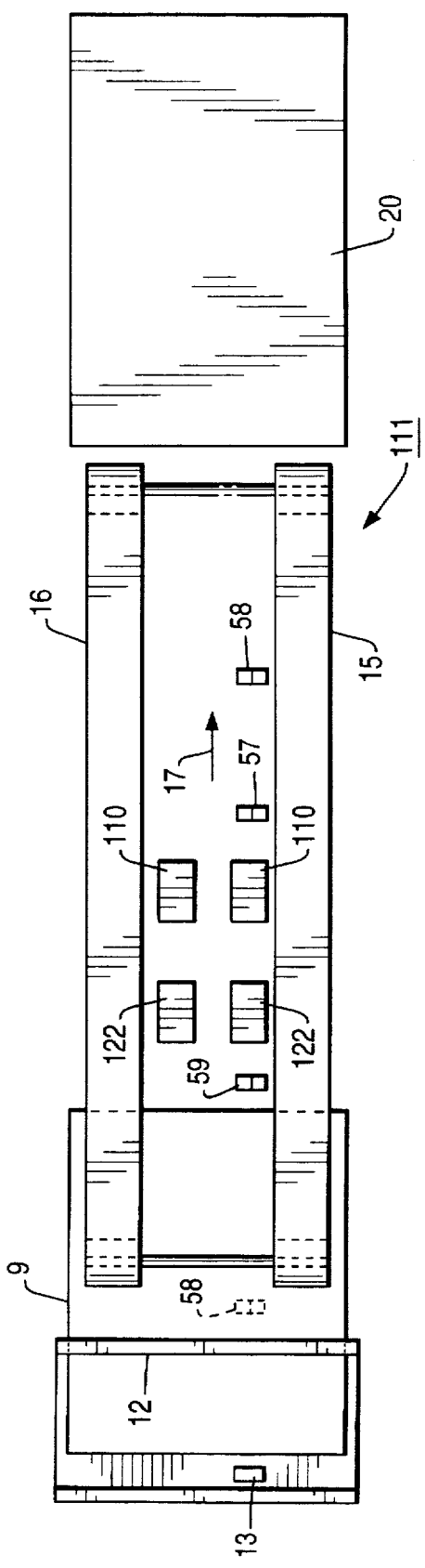
FIG. 4A
FIG. 4B

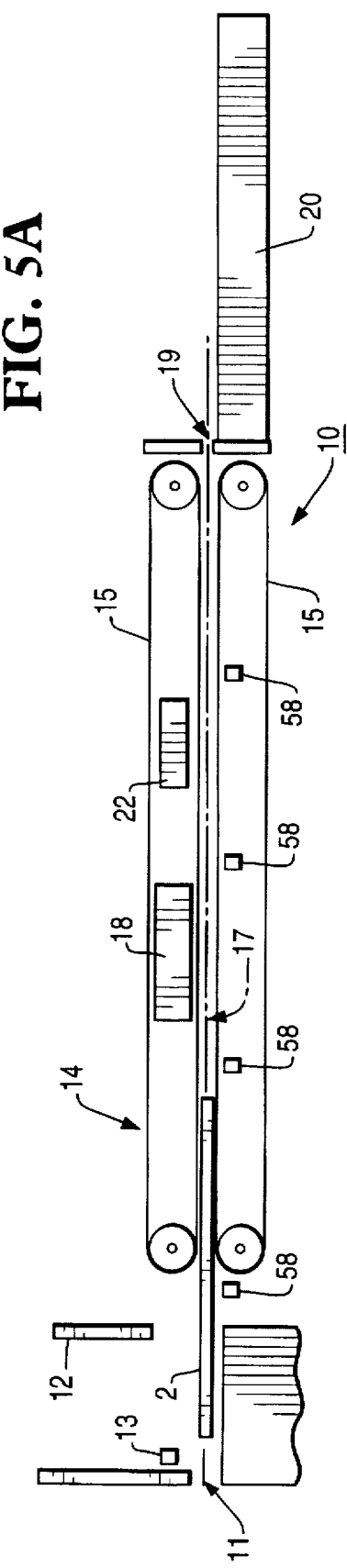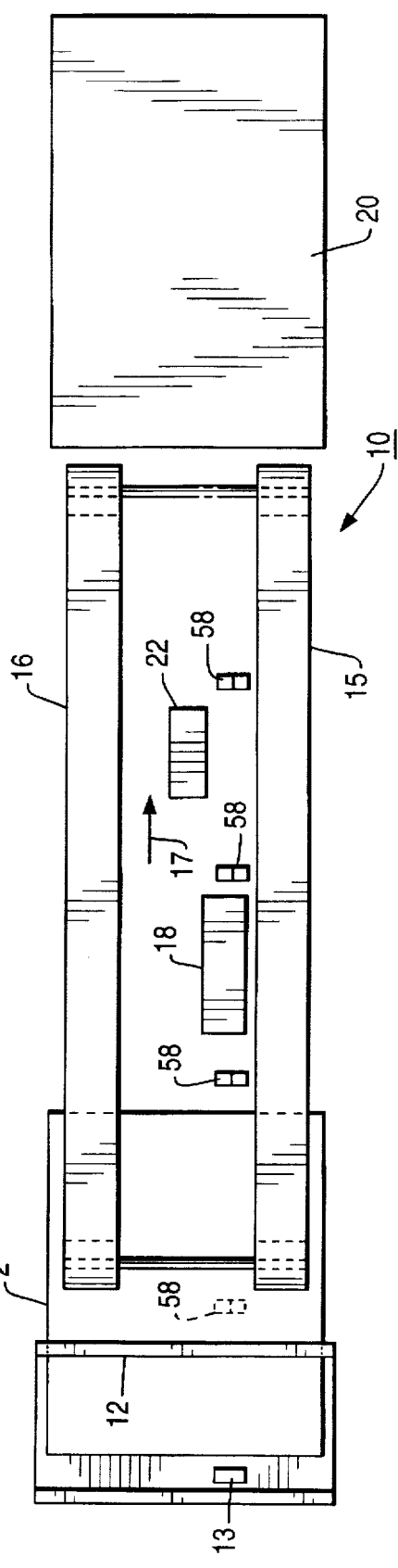

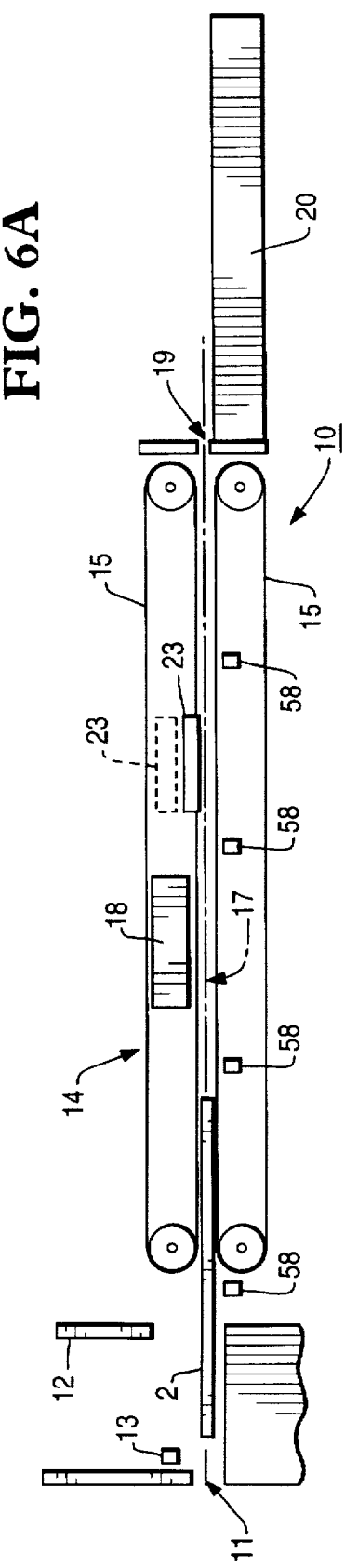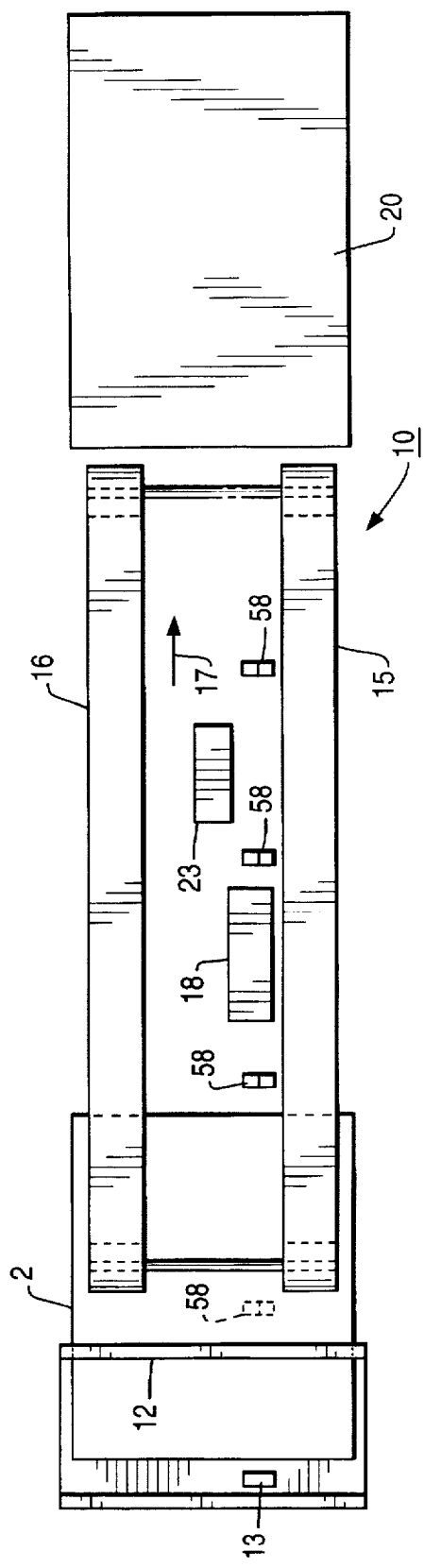

5,796,083

1

SELF-SERVICE TERMINAL CAPABLE OF DETECTING FRAUDULENT USE OF AN INTEGRATED CIRCUIT CARD

BACKGROUND OF THE INVENTION

This invention relates to a card reader system and in particular to a card reader utilized in combination with a transaction terminal such as an automated teller machine (ATM).

There are presently two types of data card that can be used in an ATM: a magnetic stripe card; and an integrated circuit (IC) card. IC cards, commonly referred to as "smart cards", carry an IC chip which can be configured to provide a variety of functions, as is well known to persons skilled in the art.

Both types of card can store a variety of encoded user information, such as, account information, or user identification information in the form of a so called PIN (Personal Identification Number) which is required by an ATM before the ATM will grant a user access to the services provided by the ATM.

Many such cards are multipurpose cards which function not only as a user identification card for use with ATMs, but also as a cheque guarantee card, and/or as a debit card which enables money to be debited from a user's bank account.

Whatever type of card is used, fraudulent or unauthorized use of such cards is a common problem, with significant consequences to the financial institutions issuing the cards.

It is known, for example, for data cards to be stolen and used in ATMs, assuming the person who stole the card knows the PIN associated with the card, usually through the authorized user of the card keeping a written note of the PIN with the card.

Even if the PIN is not known it may still be possible to make use of a multipurpose card either as a cheque guarantee card or as a debit card, as only the user's signature is required as authorization for such cards.

At present if a card is recognized by an ATM as being stolen, the ATM will retain the card in a card retention bin within the ATM. However, it is possible for cards to be stolen from such bins, either by employees of the financial institution operating the ATM who have access thereto, or by other persons who gain access to the bin by damaging the ATM.

SUMMARY OF THE INVENTION

It is an object of the present invention to provide a card reader system, which reduces the risk of data cards being fraudulently used.

According to the present invention, there is provided a card reader system including means for detecting attempted fraudulent use of a card, characterized by card invalidation means operable to render said card permanently non-usable in a card reader, in response to the detection of said attempted fraudulent use.

Attempted use by the authorized user or another person of a data card after the card has expired is also considered to constitute attempted fraudulent use of the card so far as the present description and claims are concerned.

BRIEF DESCRIPTION OF THE DRAWINGS

Embodiments of the invention will now be described, by way of example, with reference to the accompanying drawings, in which:

2

Figure 1A:
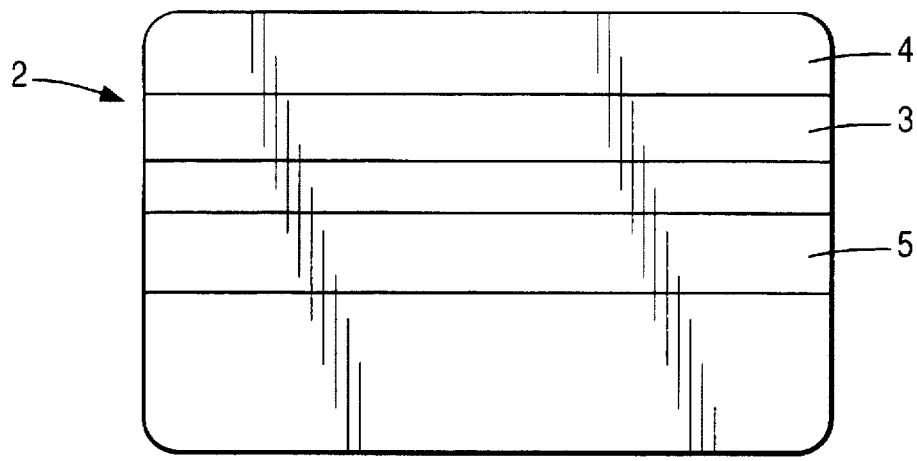
Figure 1B:
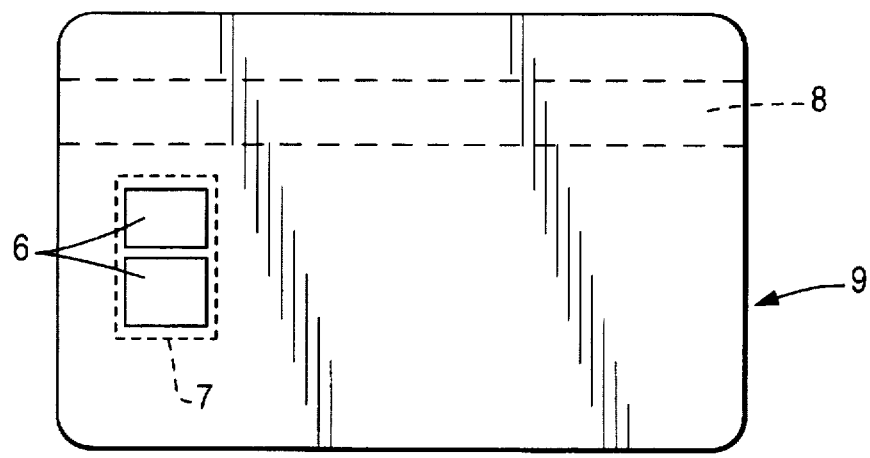
Figure 3:
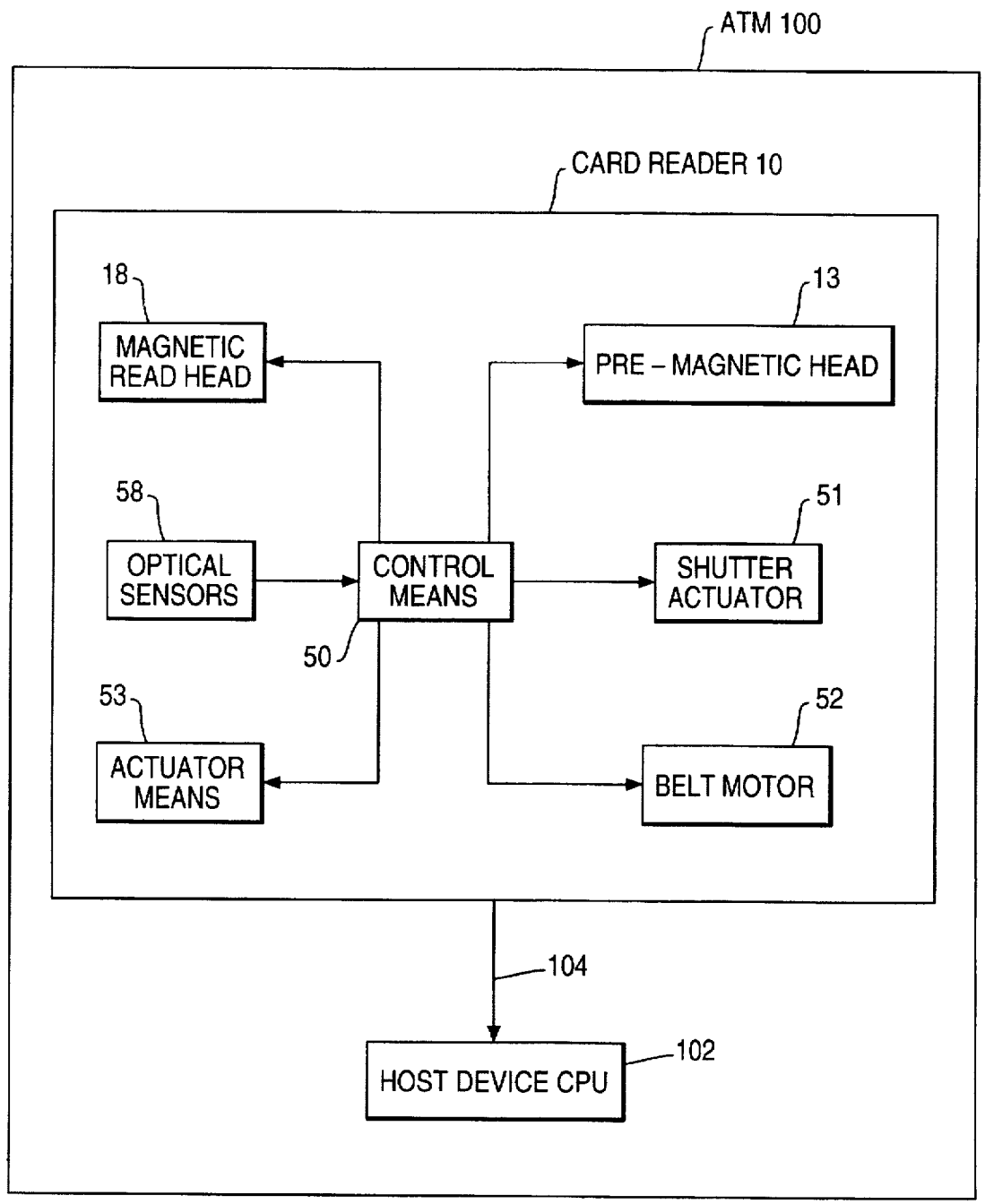
Figure 4C:
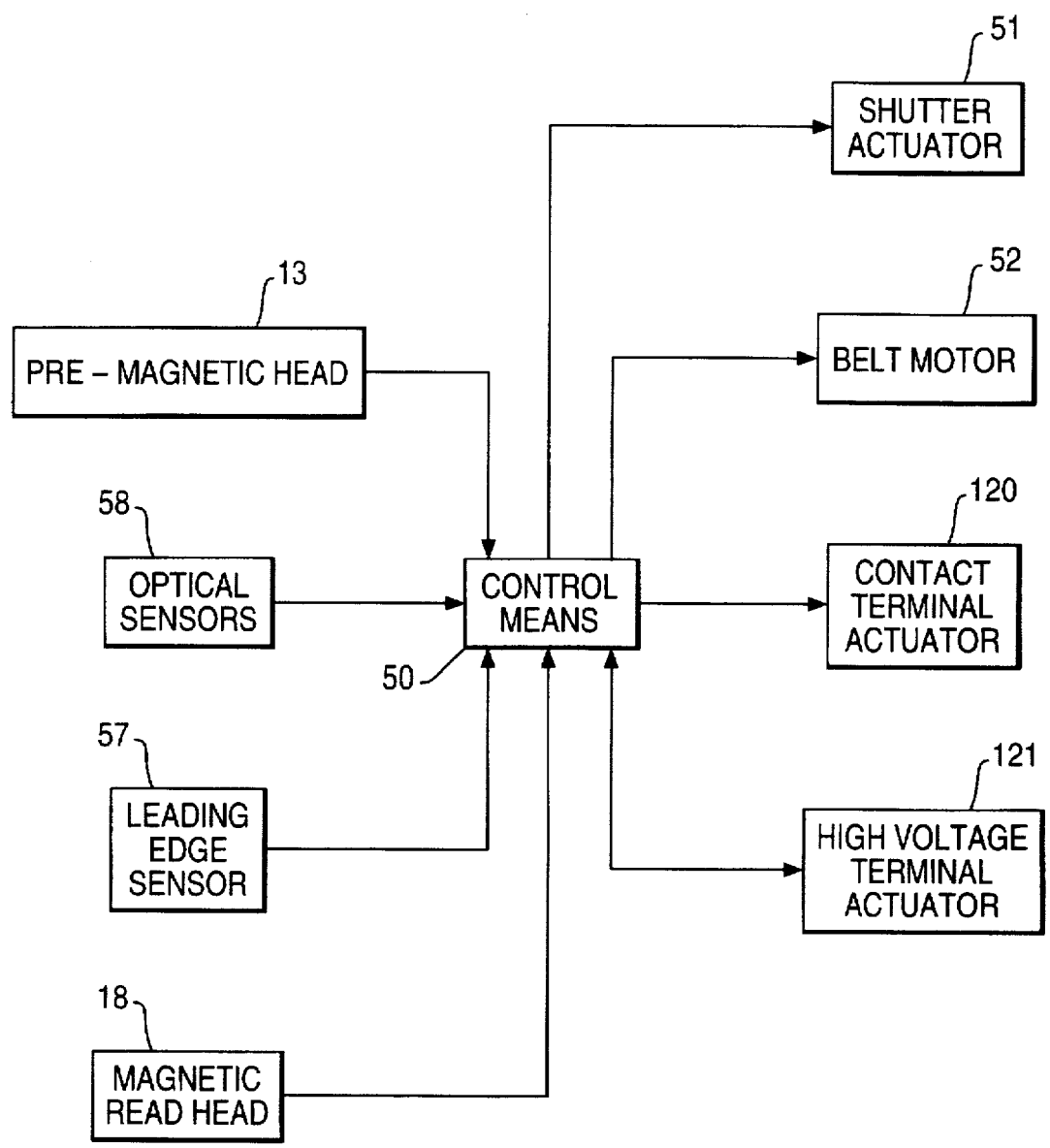

FIG. 1A is a schematic plan view of a magnetic stripe card;

FIG. 1B is a schematic plan view of a contact smart card;

FIG. 2A is a schematic side view of a magnetic stripe card reader in accordance with the present invention, with a card inserted therein;

FIG. 2B is a schematic plan view of the card reader of FIG. 2A;

FIG. 3 is a block diagram of parts of a card reader system in accordance with the present invention, including a host device;

FIG. 4A is a schematic side view of a smart card reader in accordance with the invention, with a card inserted therein;

FIG. 4B is a schematic plan view of the card reader of FIG. 4A;

FIG. 4C is a block diagram of parts of the card reader of FIG. 4A

FIG. 5A is a schematic side view of the card reader of FIG. 2, including in addition a first signature stripe invalidation means;

FIG. 5B is a schematic plan view of the card reader of FIG. 5A.;

FIG. 6A is a schematic side view of the card reader of FIG. 2 including a second signature stripe invalidation means instead of the aforementioned first signature stripe invalidation means; and FIG. 6B is a schematic plan view of the card reader of FIG. 6A.

DETAILED DESCRIPTION

FIG. 1A illustrates a magnetic stripe card 2 carrying a magnetic stripe 3 running along the length of the card 2 adjacent the reference edge 4 of the card 2. Substantially parallel to the magnetic stripe 3 is a stripe 5 designed to receive the written signature of the authorized user of the card.

FIG. 1B illustrates a smart card 9 having two contact terminals 6 positioned on one side of the card 9, as will be known to a person skilled in the art. The smart card 9 also includes a microprocessor chip 7 embedded in the card 2 beneath the terminals 6, and a magnetic stripe 8 as in the magnetic stripe card 2, illustrated in FIG. 1A, on the opposite side from the terminals 6. The magnetic stripe 8 need not contain any data and is only required to gain access to a card reader, as will be described below. The card 9 also carries a signature stripe (not shown) as in the magnetic stripe card 2 in FIG. 1A.

Most cards are substantially rectangular in shape being approximately 85 mm long and 55 mm wide.

FIGS. 2A and 2B illustrate a first embodiment of a card reader 10 in accordance with the invention. The card reader 10 is designed to read magnetic stripe cards, such as the card illustrated in FIG. 1A. A smart card reader 111 in accordance with the present invention will also be described hereinafter.

The card reader 10 is designed to be incorporated in an ATM 100 (FIG. 3), and is connected to a central processor unit (CPU) 102 in the ATM 100 via connection means 104, thus enabling communication between the control means 50 in the reader 10 and the CPU 102 in the ATM 100. Thus once the CPU 102 has determined whether or not the card 2 is stolen, the control means 50 can be instructed as to what action to take. A determination as to whether or not the card 2 is stolen is made by checking the details from the card 2 against a list of stolen cards complied by the financial institution which issued the card 2, and which is stored in the CPU 102. The data stored in the card 2 also contains an expiry date after which use of the card 2 is forbidden. Thus the CPU 102 will also decide whether or not the card 2 can be used validly at the time of insertion into the reader 10 and instruct the reader 10 as to what action to take accordingly.

The reader 10 includes an input slot 11 dimensioned so as to receive the card 2. When not in use, access to the interior of the reader 10 is prohibited by means of a retractable shutter 12, the shutter 12 being retractable so as to enable the card 2 to be received into the interior of the reader 10.

The shutter 12 is located approximately 2 cms behind the slot 11. In the space between the slot 11 and the shutter 12 is located a pre-magnetic head 13, which detects whether or not a card 2 inserted into the slot 11 has a magnetic stripe 3, and sends a signal to that effect to the control means 50 in the reader 10. The position of the shutter 12 is controlled by a shutter actuator 51 (FIG. 3), which is operable under the control of the control means 50. If the pre-magnetic head 13 fails to detect a magnetic stripe 3, then the shutter 12 will not be retracted and access to the interior of the reader 10 will be denied.

The reader 10 incorporates card feed means 14 in the form of a first pair 15 and a second pair 16 of co-operating belt means which receive the card 2 adjacent the shutter 12 and convey the card 2 along a feed path 17. The belt means 16 grip the card 2 near the reference edge 4 and the belt means 15 grip the card 2 near the edge opposite thereto, to feed the card 4 along the feed path 17.

A magnetic stripe read head 18 is located in the reader 10 so that the magnetic stripe 3 of a card 2 when transported along the feed path 17 passes below the read head 18, which can read the data therefrom. The read-head 18 detects the changes in magnetism along the length of the stripe 3 and provides an electrical signal in response thereto to the control means 50, the signals being representative of the data stored in the stripe 3, as is well known to persons skilled in the art.

In normal operation passage of the card 2 from the slot 11 throughout the reader 10 is monitored by the control means 50 via an array of known optical detectors 58, which are located along the feed path 17.

At the far end of the feed path 17, there is provided a second slot 19, which provides access to a retention bin 20, in which cards retained by the reader 10 are stored. Retention of a card is carried out in response to a signal from the control means 50, which is also operable to control all aspects of the operation of the reader 10.

When the data has been read from the magnetic stripe 3, and an authorized user has completed a valid transaction with the ATM 100, the reader 10 will return the card 2 to the slot 11 for removal by the user.

However, if a card 2 is being used fraudulently, as described above, the control means 50 causes the card 2 to be retained in the retention bin 20, by actuating the belt motor 52 (FIG. 3) to move the belt means 15, 16 in the direction opposite to that required to drive the card 2 towards the slot 11.

In presently available card readers the card 2 is merely diverted to the retention bin 20, from where it may be stolen and used fraudulently, particularly if the card is a multipurpose card, as discussed above.

A card reader in accordance with the first embodiment of the present invention is adapted to address this problem by being further provided with a means for invalidating the magnetic stripe 3 on the card 2, in the event of attempted fraudulent use of the card 2. This invalidation means takes the form of a small magnet 25 located above the card 2, in a retracted position, in line with the path taken by the magnetic stripe 3 on the card 2 as the card 2 is transported through the reader 10. The retracted position is illustrated by the dotted lines in FIG. 2A.

When a decision has been made to retain the card 2, prior to the card 2 being transported along the feed path 17 to the retention bin 20, the control means 50 sends a signal to an actuation means 53 (FIG. 3) to cause the magnet 25 to be moved towards the feed path 17 to a position such that the magnetic stripe 3 will be located in the magnetic field of the magnet 25 as it passes under the magnet 25, as illustrated by the full lines in FIG. 2A. As the magnetic stripe 3 passes through the magnetic field produced by the magnet 25, the data stored in the magnetic stripe 3 is erased. This makes the card 2 unusable in other card readers. The card 2 is thereafter retained in the usual manner.

As an alternative to a permanent magnet which is moved into and out of range of the feed path 17, a stationary electromagnet may be located in range of the feed path 17 and actuated to produce a magnetic field as required. Also, instead of retaining the card 2, the card 2 can be returned to the output slot 11 for removal from the reader 10, after being invalidated.

FIGS. 4A, 4B and 4C illustrate a smart card reader 111 in accordance with the present invention for reading information from a contact smart card 9, of the type illustrated in FIG. 1B. Those parts of the card reader 111 which are essentially the same as, and carry out the same functions as, those of the magnetic stripe card reader 10 described above are labeled with the same numerals for clarity and ease of understanding.

As with the earlier embodiments, the card reader 111 is accessed in the same way as the magnetic stripe card reader 10.

In normal operation when the card 9 is inserted into the reader 111, the belt means 15 and 16 transfer the card 9 along the feed path 17 to a predetermined position where the card 9 comes to rest. This predetermined position is established by providing a known optical location sensor 57 to detect the leading edge of the card 9. When the card 9 is at rest in this position contact terminals 110 are moved into engagement with the contact terminals 6 on the card 9 by an actuator 120 (FIG. 4C), in the form of a solenoid, and the terminals 110 activated. A reset signal is transmitted to the card 9 and an appropriate response is then sent by the chip 7 to the control means 50, wherein communication with the card 9 is established. Data is then read from the card 9. Once all the data has been transferred and any subsequent transactions with an ATM 100 completed, then the card 9 is returned to the user in the same manner as a magnetic stripe card 2 described above.

Should, however, an attempted fraudulent use of the card 9 be detected, as with the magnetic stripe card 2 discussed above in relation to the previous embodiment, the control means 50 is operable to send control signals to the belt motor 52 to return the card 9 a short distance back along the feed path 17 until the card terminals 6 are located above a second set of contact terminals 122 within the card reader 111.

This location is detected by a second optical location sensor 59 which detects the trailing edge of the card 9 in this position. The control means 50 then sends a signal to a high voltage terminal actuator 121 (FIG. 4C) causing the second set of terminals 122 to be moved into engagement with the card terminals 6. When the second set of terminals 122 are brought into engagement with the card terminals 6, then a high voltage is applied to the chip 7 in the card 9 via the terminals 122,6. This high voltage is sufficient to destroy the chip 7, rendering the card 9 unusable in card readers.

In the embodiments of the present invention described above the data stored either on the magnetic stripe or smart card 2,9 is destroyed while the card 2,9 itself remains intact. Therefore, if either of these embodiments is utilized there may be scope for fraudulent use of a multipurpose card as a cheque card or a debit card, whereupon the necessary information for the use of the card 2,9 can be obtained from the front of the card 2,9 rather than from the magnetic stripe 3 or IC chip 7.

Accordingly, there may in addition be a need for the card 2,9 to be invalidated for use outside of a card reader, as is addressed in the following two embodiments of the present invention.

In a further embodiment of the present invention, illustrated in FIGS. 5A and 5B, the card reader 10 is provided with an ink reservoir means 22 located above the feed path 17 in line with the path taken by the signature stripe 5 on a card 2, as the card 2 passes through the reader 10. When an attempt at fraudulent use of the card 2 has been detected, then the control means 50 sends a signal to the ink reservoir means 22 to spray a small quantity of ink over the signature strip 5, as the card 2 is moved to the retention bin 20, under the control of the belts 15 and 16, thereby permanently defacing the signature stripe 5 and so rendering the card 2 invalid. Such a device may also be used in a smart card reader 111.

In the final embodiment of the present invention, illustrated in FIGS. 6A and 6B, the card reader 10 is provided with a defacing blade 23, in a substantially similar location to the ink reservoir means 22 described above. In this case, in the event of a fraudulent use being detected, as the card 2 is being moved towards the retention bin 20 as discussed above, instead of ink blotting out the signature strip 5 the blade 23 is moved from a retracted position, illustrated by the dotted lines in FIG. 6A, to a position where an edge of the defacing blade 23 is brought into contact with the signature strip 5, illustrated by the full lines in FIG. 6A, thus scratching the signature stripe 5 and invalidating the card 2. As with the ink reservoir means 22 the blade 23 can be used to invalidate both a magnetic stripe card 2 or a smart card 9.

It will be readily understood to persons skilled in the art, that various modifications are possible within the scope of the present invention. For example, any of the invalidation procedures described above could be triggered in response to any predetermined occurrence, for example when the incorrect use of a PIN is detected.

Also either signature stripe invalidation means 22, 23 can be used with either the magnetic stripe card reader 10 or the smart card reader 111, or with a combination reader arranged to read both magnetic stripe and smart cards.

What is claimed:

1. An apparatus comprising:

card reader means for receiving an integrated circuit (IC) card from a user;

detector means for detecting attempted fraudulent use of an IC card when the card reader means receives the IC card from a user; and actuatable high voltage means for, when actuated in response to the detector means detecting attempted fraudulent use of an IC card, applying a high voltage to a set of card terminals of the IC card to destroy an IC chip of the IC card and thereby to render the IC card permanently non-usable.

2. An apparatus for a self-service terminal comprising:

means defining a transport path along which a smart card can move;

a transport mechanism for (i) receiving a smart card from a user at a self-service terminal, (ii) moving the smart card to a first position along the transport path when the smart card is received from the user, and (iii) moving the smart card to a second position along the transport path when an attempted fraudulent use of the smart card is detected;

a contact terminal actuator including a first set of contact terminals movable into engagement with a set of contact terminals of a smart card when the smart card is in the first position along the transport path;

a high voltage terminal actuator including a second set of contact terminals movable into engagement with a set of contact terminals of a smart card when the smart card is in the second position along the transport path; and a controller for (i) controlling the contact terminal actuator to move the first set of contact terminals into engagement with a set of contact terminals of a smart card to allow data to be read from an integrated circuit chip of the smart card when the smart card is in the first position along the transport path, and (ii) controlling the high voltage terminal actuator to move the second set of contact terminals into engagement with the set of contact terminals of the smart card to allow a high voltage to be applied to the integrated circuit chip of the smart card to destroy the integrated circuit chip and thereby to render the smart card permanently non-usable when the smart card is in the second position along the transport path.

3. An apparatus according to claim 2, further comprising a first sensor disposed along the transport path and for (i) sensing the presence of a leading edge of a smart card when the smart card moves into the first position along the transport path, and (ii) providing a first output signal indicative thereof, the controller controlling the contact terminal actuator to move the first set of contact terminals into engagement with a set of contact terminals of the smart card in response to the first output signal from the first sensor.

4. An apparatus according to claim 16, further comprising a second sensor disposed along the transport path and for (i) sensing the presence of a trailing edge of a smart card when the smart card moves into the second position along the transport path, and (ii) providing a second output signal indicative thereof, the controller controlling the high voltage terminal actuator to move the second set of contact terminals into engagement with the set of contact terminals of the smart card in response to the second output signal from the second sensor.

* * * * *

UNITED STATES PATENT AND TRADEMARK OFFICE
CERTIFICATE OF CORRECTION

PATENT NO. : 5,796,083
DATED : Aug. 18, 1998
INVENTOR(S) : Alexander R. Kenneth et al.

It is certified that error appears in the above-indentified patent and that said Letters Patent is hereby corrected as shown below:

Column 6, line 51, "after claim" delete "16" and insert --3--.

Signed and Sealed this

Second Day of March, 1999

Attest:

Q. TODD DICKINSON

Attesting Officer

Acting Commissioner of Patents and Trademarks